(12) United States Patent
Rafiq et al.

(10) Patent No.: US 8,667,018 B2
(45) Date of Patent: Mar. 4, 2014

(54) METHOD AND SYSTEM FOR OPTIMIZING ROW LEVEL SECURITY IN DATABASE SYSTEMS

(75) Inventors: Mohammed Irfan Rafiq, Mountain View, CA (US); Chon Hei Lei, Alameda, CA (US); Vikram Kapoor, Cupertino, CA (US); Thomas F. Keefe, Mill Valley, CA (US); Nipun Agarwal, Santa Clara, CA (US); Thomas Baby, Maple Valley, WA (US); Sam Idicula, Santa Clara, CA (US); Vikram Reddy Pesati, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1188 days.

(21) Appl. No.: 12/188,675

(22) Filed: Aug. 8, 2008

(65) Prior Publication Data

US 2010/0036846 A1 Feb. 11, 2010

(51) Int. Cl.
- G06F 7/00 (2006.01)
- G06F 17/00 (2006.01)
- G06F 17/30 (2006.01)

(52) U.S. Cl.
USPC ............ 707/783; 707/745; 707/705

(58) Field of Classification Search
USPC .......................................... 709/227
See application file for complete search history.

(56) References Cited

U.S. PATENT DOCUMENTS

| | | | |
|---|---|---|---|
| 6,466,983 B1* | 10/2002 | Strazza | 709/227 |
| 2003/0065644 A1* | 4/2003 | Horman et al. | 707/1 |
| 2003/0182276 A1* | 9/2003 | Bossman et al. | 707/3 |
| 2005/0187917 A1* | 8/2005 | Lawande et al. | 707/3 |
| 2007/0038595 A1* | 2/2007 | Ghosh et al. | 707/2 |

* cited by examiner

*Primary Examiner* — Susan Chen
(74) *Attorney, Agent, or Firm* — Shun Yao; Park, Vaughan, Fleming & Dowler LLP (57) ABSTRACT

One embodiment of the present invention provides a system that implements a security policy in a database. During operation, the system receives a request associated with a set of objects in the database. Next, the system obtains a set of access control lists (ACLs) associated with the database, wherein a respective ACL specifies one or more access privileges associated with a user or user group, and wherein a respective ACLs is not specific to a particular object in the database. The system then evaluates the ACLs to obtain a set of ACL results associated with the request and processes the request by applying the set of ACL results to the objects without evaluating the ACLs repeatedly for each of the objects.

24 Claims, 7 Drawing Sheets

```
<ACL>
    <SECURITYCLASS>sc1</SECURITYCLASS>
    <ACE>
        <GRANT>true</GRANT>
        <PRINCIPAL>user1</PRINCIPAL>
        <PRIVILEGES>
            <PRIV>read</PRIV>
            <PRIV>write</PRIV>
            <PRIV>execute</PRIV>
        </PRIVILEGES>
    </ACE>
    <ACE>
        <GRANT>true</GRANT>
        <PRINCIPAL>user2</PRINCIPAL>
        <PRIVILEGES>
            <PRIV>read</PRIV>
        </PRIVILEGES>
    </ACE>
</ACL>
```

XML ACCESS CONTROL LIST 300

METHOD AND SYSTEM FOR OPTIMIZING ROW LEVEL SECURITY IN DATABASE SYSTEMS

RELATED APPLICATION

The subject matter of this application is related to the subject matter in a co-pending non-provisional application by Sam Idicula, Mohammed Irfan Rafiq, and Nipun Agarwal, entitled, "PERFORMING COST-BASED OPTIMIZATIONS OF AUTHORIZATION CHECKS IN DATABASE SYSTEMS," having Ser. No. 12/144,028, and filing date 23 Jun. 2008, the disclosure of which is incorporated in its entirety herein.

BACKGROUND

1. Field of the Invention

The present invention relates to security policies. More specifically, the present invention relates to a method and system for optimizing row level security in database systems.

2. Related Art

Many database systems use Access Control Lists (ACLs) to describe security policies for the database systems. Each ACL may further include a list of Access Control Entries (ACEs) that specify a set of access privileges granted or denied to a particular entity, such as a user or role. ACLs are typically stored as XML documents, and provide a declarative way to define security policies. In many instances, these ACLs are also stored in the database system.

In addition, row level security may be implemented by the database system. In particular, row level security may be provided by associating each ACL with a predicate that determines the application of the ACL to a database row and/or other object in the database. Conventionally, the predicates and ACLs are often evaluated for each database row returned in response to a database query to determine access privileges to the individual database rows. As a result, query time for a database table in the database system may increase linearly with the number of rows in the database table using existing database row level security implementations. The increase in query time may further result in a negative performance impact on the database system.

Hence, row level security in database systems may be improved through mechanisms that optimize the evaluation of ACLs and/or predicates for database rows.

SUMMARY

One embodiment of the present invention provides a system that implements a security policy in a database. During operation, the system receives a request associated with a set of objects in the database. Next, the system obtains a set of access control lists (ACLs) associated with the database, wherein a respective ACL specifies one or more access privileges associated with a user or user group, and wherein a respective ACL is not specific to a particular object in the database. The system then evaluates the ACLs to obtain a set of ACL results associated with the request and processes the request by applying the set of ACL results to the objects without evaluating the ACLs repeatedly for each of the objects. The system further produces a result in response to the request.

In some embodiments, obtaining the ACL results involves storing the ACL results in a bitmap and providing the bitmap for subsequent retrieval of the ACL results.

In some embodiments, each of the ACL results is stored in the bitmap as a grant, a deny, an irrelevant, or an unknown.

In some embodiments, applying the ACL results to the objects involves obtaining a set of predicates associated with the ACLs, evaluating the predicates based on the objects, and determining access privileges for the request based on the evaluated predicates and the ACL results.

In some embodiments, the access privileges are associated with at least one of a read privilege, a write privilege, and an execute privilege.

In some embodiments, the access privileges are determined based on an order of the ACL results.

In some embodiments, the objects correspond to database rows, and the request corresponds to a database query.

In some embodiments, the ACL results are based on a security context associated with the request. In these embodiments, the security context corresponds to at least one of session information associated with the request, a user associated with the request, and a role of the user.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system perform the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field programmable gate arrays (FPGAs), and other programmable-logic devices now known or later developed. When the hardware modules are activated, the hardware modules perform the methods and processes included within the hardware modules.

Embodiments of the present invention provide a method and system for implementing a security policy in a database. The security policy may be described using one or more access control lists (ACLs) and/or one or more access control entries (ACEs) within the ACLs. More specifically, embodiments of the present invention provide a method and system for optimizing row level security in the database. Each ACL may be associated with a predicate that determines the application of the ACL to one or more objects (e.g., database rows) in the database.

To apply the security policy, the ACLs associated with a request (e.g., a database query) are evaluated to obtain a set of ACL results, which may be stored in a bitmap. Each ACL result may indicate a grant or denial of an access privilege associated with the database query. The access privilege may correspond to a read privilege, a write privilege, and/or an execute privilege. Moreover, the bitmap may be used to determine access privileges to each object without evaluating the ACLs repeatedly for every object associated with the request. Consequently, embodiments of the present invention may enable optimization of row level security in database systems by reducing query time associated with applying row level security to a database query.

Figure 1A:
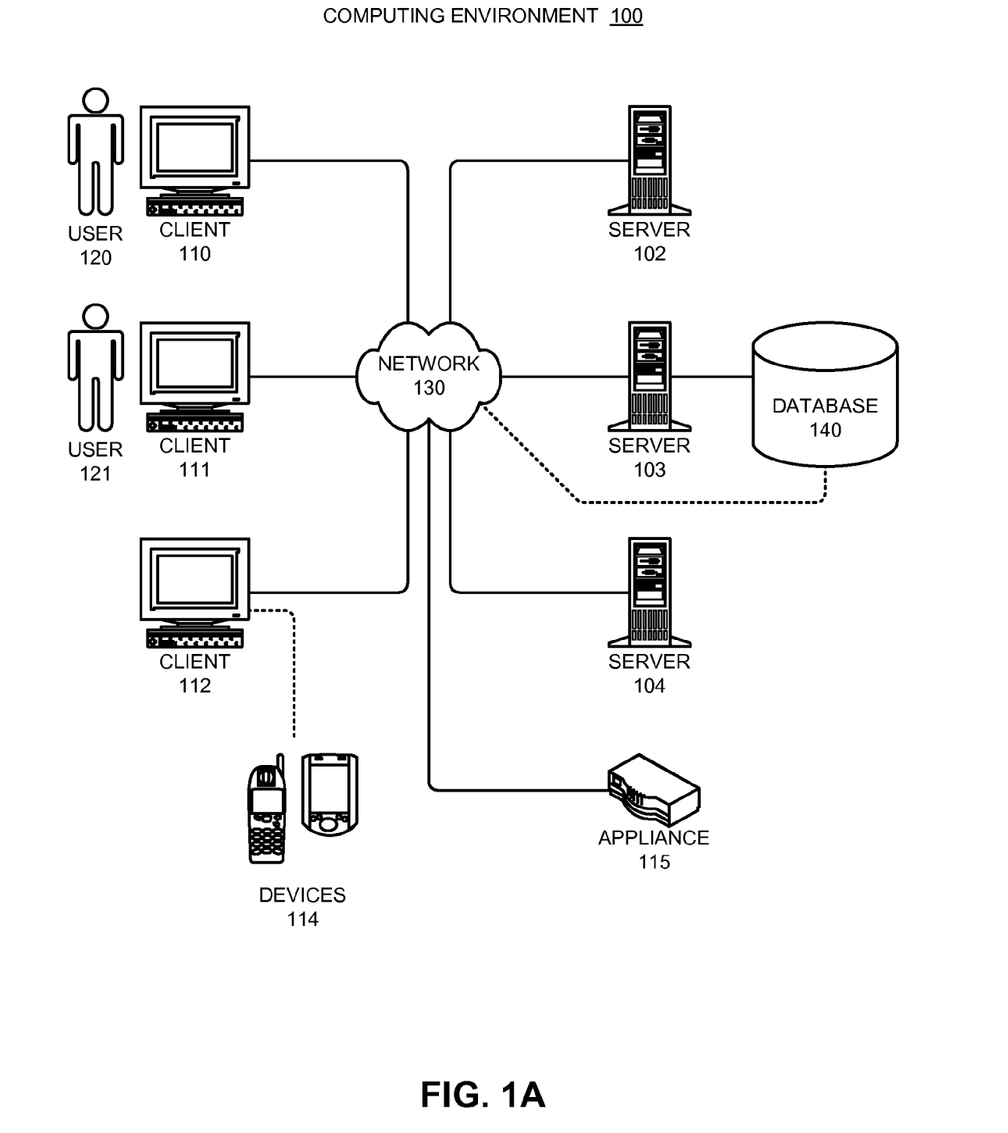
FIG. 1A shows a computing environment in accordance with an embodiment of the present invention.

FIG. 1A illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. In particular, computing environment 100 includes a set of clients 110-112, a set of users 120-121, a set of servers 102-104, a network 130, a database 140, a set of devices 114, and an appliance 115.

Clients 110-112 may represent nodes on network 130 with computational capability and mechanisms for communicating across the network. For example, clients 110-112 may correspond to personal computers (PCs), laptop computers, workstations, and/or other electronic computing devices with network connectivity. Furthermore, clients 110-112 may connect to network 130 using one or more wired and/or wireless connections.

Similarly, servers 102-104 may correspond to nodes on a network that include functionality to service requests from clients 110-112 for computational and/or data storage resources. For example, servers 102-104 may allow clients 110-112 to access websites, enterprise applications, streaming media, and/or other features and data provided by servers 102-104. Servers 102-104 may participate in an advanced computing cluster, or can act as stand-alone servers. In one or more embodiments of the present invention, server 104 is an online "hot spare" of server 103.

Users 120-121 may access computing environment 110 through clients 110-112. Each user 120-121 may correspond to: an individual; a group of individuals; an organization; a group of organizations; a computing system; a group of computing systems; or any other entity that includes functionality to interact with computing environment 100. For example, users 120-121 may be associated with user accounts and/or user roles that enable access to one or more clients 110-112 and/or servers 102-104.

Network 130 may correspond to any type of wired or wireless communication channel capable of coupling together computing nodes (e.g., clients 110-112, servers 102-104). This includes, but is not limited to, a local area network (LAN), a wide area network (WAN), and/or a combination of networks. In one or more embodiments of the present invention, network 130 includes the Internet. Network 130 may also include phone and cellular phone networks, such as Global Systems for Mobile communications (GSM) networks.

Database 140 may include functionality to store data in non-volatile storage. Non-volatile storage may include, but is not limited to, systems based upon magnetic, optical, or magneto-optical storage devices, as well as storage devices based on flash memory and/or battery-backed up memory. Furthermore, reads, writes, and/or modifications to database 140 may be managed by a database management system (DBMS), such as a relational database management system (RDBMS). For example, database 140 may be administered by a Structured Query Language (SQL) DBMS. Note that database 140 can be coupled to a server (such as server 103), a client, and/or directly to network 130.

Devices 114 can include any type of electronic device that can be coupled to a client, such as client 1 12. This includes, but is not limited to, cell phones, Personal Digital Assistants (PDAs), smart-phones, portable media players gaming systems, digital cameras, portable storage media, and/or any other device that can be coupled to the client. In one or more embodiments of the present invention, devices 114 are coupled directly to network 130 and function in the same manner as clients 110-112.

Appliance 115 may correspond to a network appliance that is coupled to network 130. For example, appliance 115 may include one or more routers, switches, load balancers, network accelerators, and/or specialty processors. Appliance 115 may act as a gateway, a proxy, or a translator between server 104 and network 130.

Note that different embodiments of the present invention may use different configurations, and are not limited to the configuration illustrated in computing environment 100.

Figure 1B:
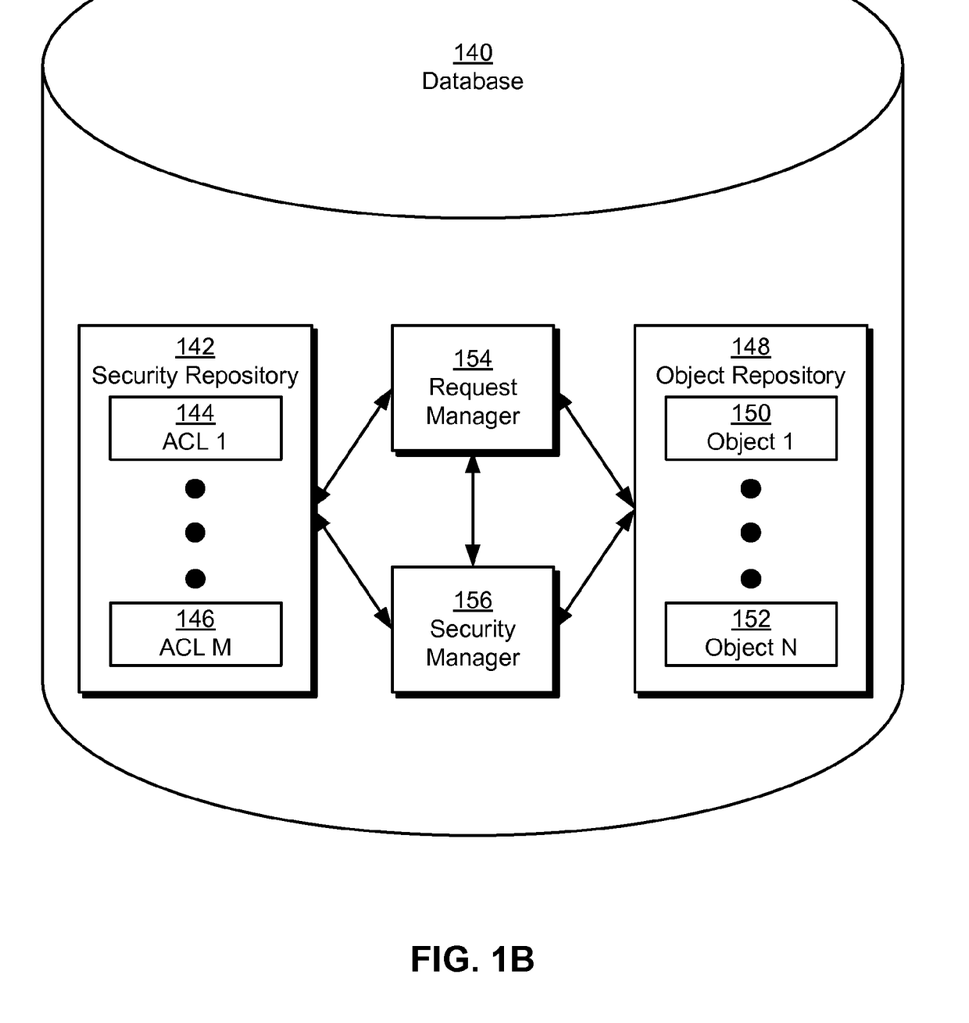
FIG. 1B shows a database in accordance with an embodiment of the present invention.

FIG. 1B shows database 140 in accordance with an embodiment of the present invention. As shown in FIG. 1B, database 140 includes a security repository 142 that includes a set of access control lists (ACLs) (e.g., ACL 1 144, ACL m 146), an object repository 148 containing a set of objects (e.g., object 1 150, object n 152), a request manager 154, and a security manager 156.

In one or more embodiments of the present invention, database 140 is implemented as a relational database. As mentioned previously, the organization, storage, management, and retrieval of objects (e.g., object 1 150, object n 152) in database 140 may be controlled by an RDBMS. More specifically, objects in object repository 148 may be stored in relations, or database tables. Furthermore, each object may correspond to a database row in a database table. In other words, object repository 148 may store data according to a schema associated with database 140 as database rows in one or more database tables. Operations on the database rows and/or database tables may then be performed using requests (e.g., database queries) that utilize relational algebra. The requests may be received and processed by request manager 154 associated with the DBMS for database 140.

Those skilled in the art will appreciate that access to objects in object repository 148 may be restricted based on a security policy associated with database 140. The security policy may also include an access control policy. More specifically, the security policy may specify access privileges to objects in object repository 148 based on security contexts associated with requests to database 140. The implementation of the security policy may be performed by security manager 156 using one or more ACLs (e.g., ACL 1 144, ACL M 146) in security repository 142, as discussed below.

In one or more embodiments of the invention, ACLs in security repository 142 correspond to lists of access privileges for various requests to database 140. The access privileges may be stored in access control entries (ACEs) for one or more security contexts associated with database 140. In particular, the security context may correspond to session information associated with a request, a user associated with the request, and/or a role of the user. As a result, access privileges to objects in object repository 148 may be specified for individual users and/or roles of one or more users through the ACLs and ACEs within the ACLs. Security contexts for users and roles are explained in further detail below with respect to FIGS. 2A-2C.

As a request is received by request manager 154, the request may be processed to retrieve a set of objects from object repository 148 that are associated with the request. The objects may further be processed by security manager 156 to enforce the security policy for database 140 prior to responding to the request. More specifically, security manager 156 may obtain a set of ACLs from security repository 142 associated with database 140. Security manager 156 may additionally evaluate the ACLs once to obtain a set of ACL results, which specify access privileges associated with the request based on the security context of the request. For example, the ACL results may be obtained from evaluation of the ACLs to determine access privileges to the first object (e.g., database row) associated with the request.

The ACL results may then be stored in a bitmap for subsequent retrieval of the ACL results in processing the request. Each ACL result in the bitmap may occupy two bits of the bitmap. Furthermore, each ACL result may specify a grant, deny, irrelevant, or unknown with respect to an access privilege associated with the request. The request may then be processed by security policy 156 using the ACL results in the bitmap in lieu of the ACLs, thus precluding repeated evaluation of the ACLS for each of the objects. Bitmaps for storing ACL results are described in further detail below with respect to FIG. 4B.

In one or more embodiments of the invention, row level security is implemented using ACLs in security repository 142 and security manager 156. As a result, each ACL may not be specific to objects in object repository 148. Instead, the application of ACL results to objects in object repository 148 may be specified using a set of predicates associated with the ACL results and/or objects. For example, a predicate may apply an ACL result to an object in object repository 148 based on data values stored in the object (e.g., attributes, columns, etc.).

Furthermore, evaluation of the ACL results to determine access privileges may be based on the order of the ACL results. In other words, the first ACL result that is applicable to an object may be used to determine access privileges to the object. More specifically, the first ACL result and predicate that specify a grant or denial of access privileges to the object is applied to the request for the object.

Those skilled in the art will appreciate that security manager 156 may use other ACL evaluation methods for objects in object repository 148. For example, security manager 156 may be configured to use a "deny-trumps-grant" evaluation of ACL results and predicates. In other words, an ACL result that denies access to a given object causes access privileges to the object to be denied, regardless of the existence or order of other ACL results for the object.

Figure 2A:
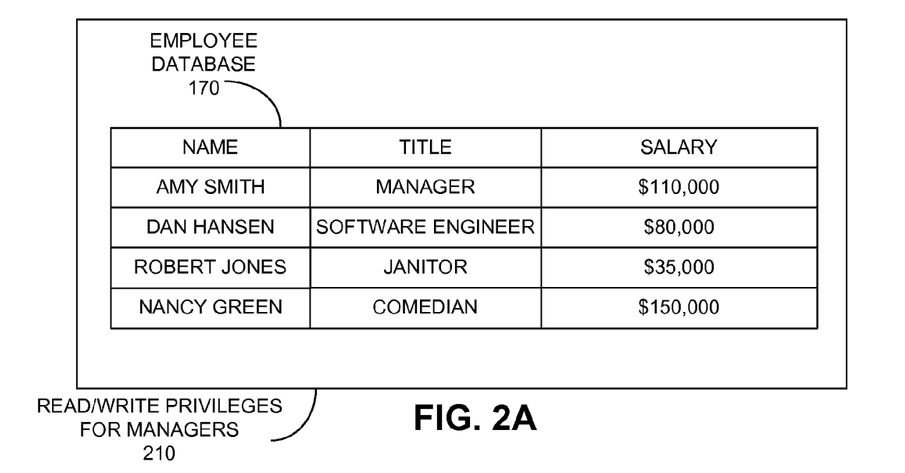
FIGS. 2A, 2B, and 2C show subsets of a database 170 and various results of access control entries and subjects in accordance with an embodiment of the present invention.
Figure 2B:
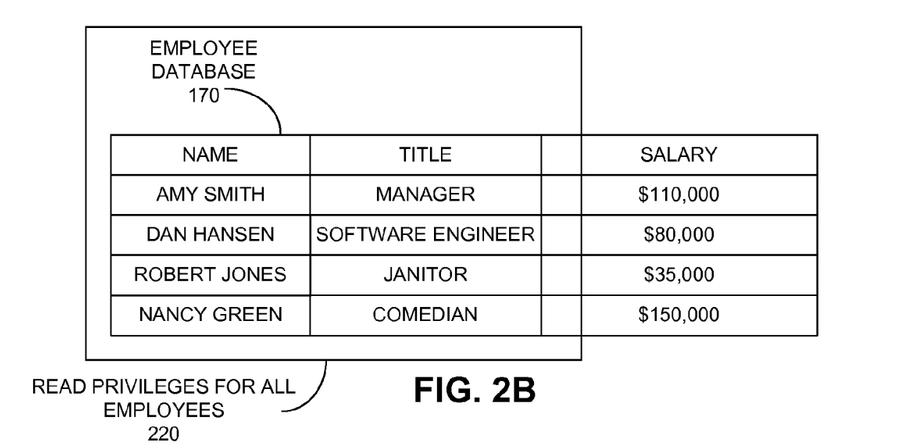
Figure 2C:
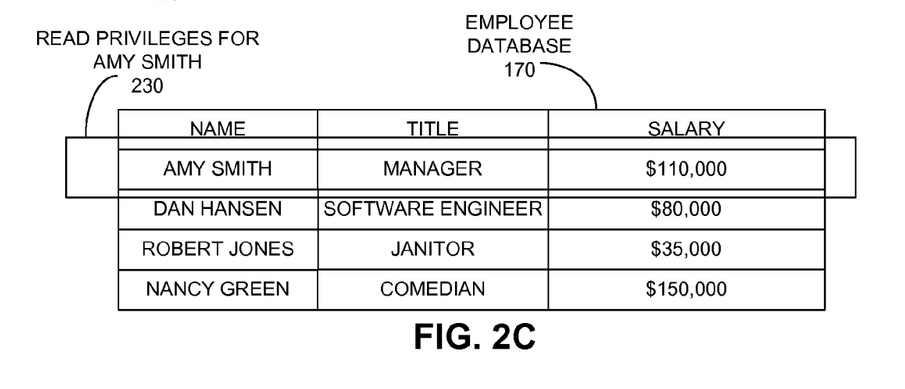

FIGS. 2A, 2B, and 2C show subsets of database 140 and various results of access control and subjects in accordance with an embodiment of the present invention. For example, FIG. 2A illustrates the result of applying an access control policy for a manager role, indicated as READ/WRITE privileges for managers 210. Note that the manager is allowed read access and write access to all of the entries in the employee database. In contrast, FIG. 2B illustrates the result of applying an access control policy for an employee role, indicated as READ privileges for all employees 220, wherein employees are allowed read access only to the names and titles of employees and not their salaries. FIG. 2C illustrates the result of applying an access control policy for user "Amy Smith," indicated as READ privileges for Amy Smith 230, wherein "Amy Smith" is only allowed to read the entire row associated with "Amy Smith."

Figure 3:
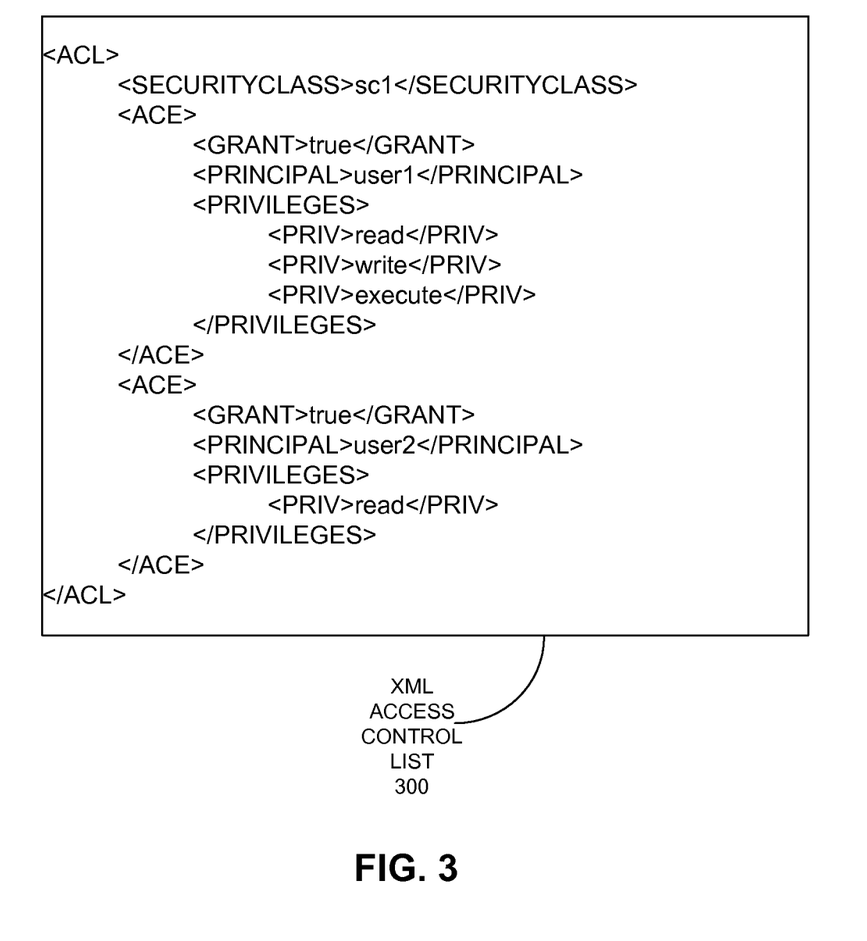
FIG. 3 shows an XML ACL in accordance with an embodiment of the present invention.

FIG. 3 shows an ACL 300 in accordance with an embodiment of the present invention. In particular, FIG. 3 shows ACL 300 described using Extensible Markup Language (XML). This ACL is associated with security class "sc1." It also contains a set of ACEs, with one ACE per user in the security class. For example, subject "user1" is granted read, write, and execute privileges for the object associated with ACL 300, while subject "user2" is only granted read privileges for the object associated with ACL 300. As a result, security class "sc1" and users "user1" and "user2" may establish one or more security contexts of ACL 300. Various XML-based techniques can be used to represent the same information. For example, the same information might be distributed in multiple XML documents.

Figure 4A:
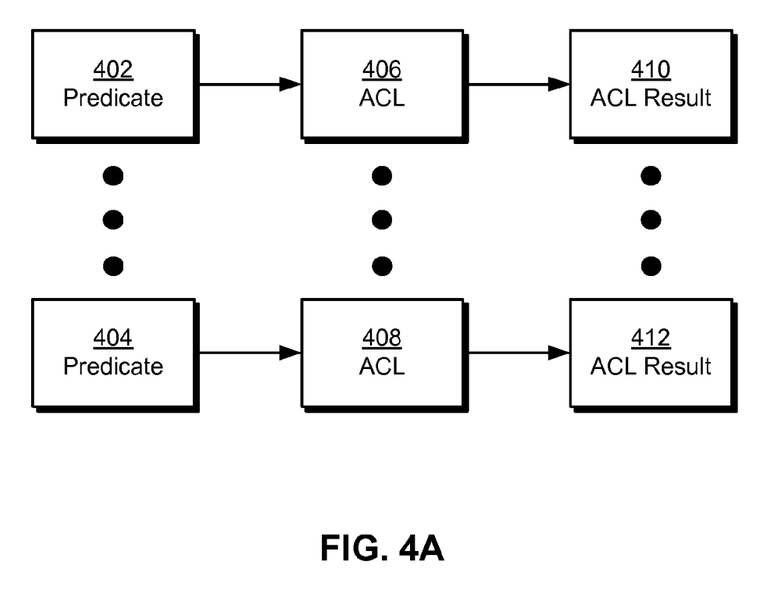
FIG. 4A shows an ACL evaluation process in accordance with an embodiment of the present invention.

FIG. 4A shows an ACL evaluation process in accordance with an embodiment of the present invention. The ACL evaluation process begins with a set of predicates 402-404 and a set of ACLs 406-408 associated with the predicates. ACLs 406-408 and/or predicates 402-404 may be stored in a security repository, such as security repository 142 of FIG. 1B.

As described above, predicates 402-404 may determine the application of ACLs 406-408 to objects in a database, such as database 140 of FIGS. 1A-1B. For example, predicates 402-404 may apply ACLs 406-408 to database tables, certain rows of a database table, and/or attributes of objects (e.g., database rows) in the database. In other words, predicates 402-404 and ACLs 406-408 may provide a row level security policy associated with the database.

Each ACL 406-408 may then be evaluated to obtain an ACL result 410-412. As described above, ACL results 410-412 may be obtained during evaluation of ACLs 406-408 for the first object associated with a request (e.g., database query). Furthermore, because ACLs 406-408 are not dependent on individual objects in the database, ACL results 410-412 may be applied to all objects in a request without repeatedly evaluating ACLs 406-408 for each of the objects.

In particular, each ACL result 410-412 may specify an access privilege that corresponds to a "grant," a "deny," an "irrelevant," or an "unknown." A "grant" may grant all access privileges associated with the request, while a "deny" may deny one or more access privileges associated with the request. An "irrelevant" denotes an inapplicability of the corresponding ACL to the request and may allow the ACL result to be skipped for all objects associated with the request. Finally, an "unknown" indicates that the ACL has not been evaluated, or if the ACL grants some but not all access privileges associated with the request.

In addition, the values of ACL results 410-412 may be processed based on a security context (e.g., user, role, session information, etc.) associated with the request. For example, ACL result 410 may be set to "grant" if ACL 406 grants all access privileges requested for the user associated with the request, while ACL result 412 may be sent to "irrelevant" if ACL 408 does not describe access privileges for the security context associated with the request.

As mentioned previously, the access privileges may be determined based on an order of ACL results 410-412. In other words, if ACL result 410 is applicable to the request based on predicate 402, the access privileges granted or denied in ACL result 410 may be used to process the request regardless of the grant or denial of privileges in ACL result 412. However, if ACL result 410 is either an "irrelevant" or an "unknown," any access privileges specified in ACL 406 may be tracked and the remaining access privileges may be determined from subsequent ACLs and/or ACL results. For example, if ACL result 410 is set to "unknown," ACL 406 may be evaluated to determine the grant or denial of some access privileges associated with the request. The remaining access privileges may then be determined from other ACLs (e.g., ACL 408) and/or ACL results (e.g., ACL result 412) associated with the request.

Figure 4B:
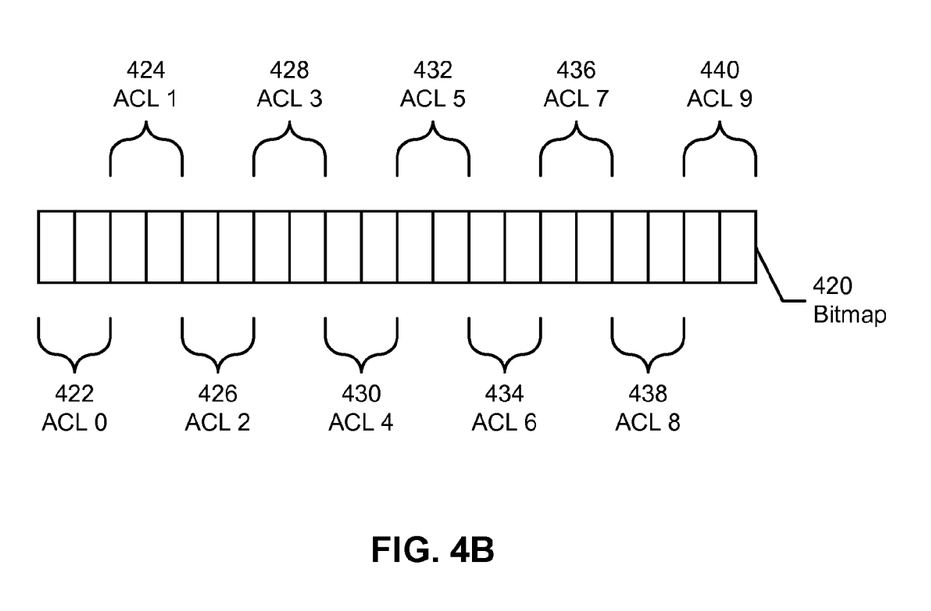
FIG. 4B shows an ACL bitmap in accordance with an embodiment of the present invention.

FIG. 4B shows an ACL bitmap 420 in accordance with an embodiment of the present invention. As discussed above, bitmap 420 may store a set of ACL results associated with a request to a database (e.g., a database query). Furthermore, bitmap 420 may reduce the query time associated with processing the request by minimizing the processing of ACLs to once per request. The storage of ACL results in bitmap 420 may further enable computationally efficient operations such as bitwise operations to be used in processing the request.

As shown in FIG. 4B, bitmap 420 stores ACL results from ten ACLs (e.g., ACL 0 422, ACL 1 424, ACL 2 426, ACL 3 428, ACL 4 430, ACL 5 432, ACL 6 434, ACL 7 436, ACL 8 438, ACL 9 440). Each ACL result occupies two bits of bitmap 420. Furthermore, one of four ACL results may be encoded in the bits associated with each ACL. As mentioned previously, the four ACL results may correspond to "grant," "deny," "irrelevant," and "unknown."

The ACL results may then be evaluated using the corresponding positions and/or offsets for each ACL in bitmap 420. For example, an ACL result for ACL 6 432 may be obtained by examining the bits at positions twelve and thirteen in bitmap 420. Similarly, an ACL result for ACL 0 422 may be obtained by examining the bits at positions zero and one in bitmap 420. Consequently, row level security for a database query may be implemented by traversing bitmap 420 and determining the grant or denial of access privileges requested in the database query from ACL results encoded in bitmap 420 and/or predicates associated with the ACLs, such as predicates 402-404.

Figure 5:
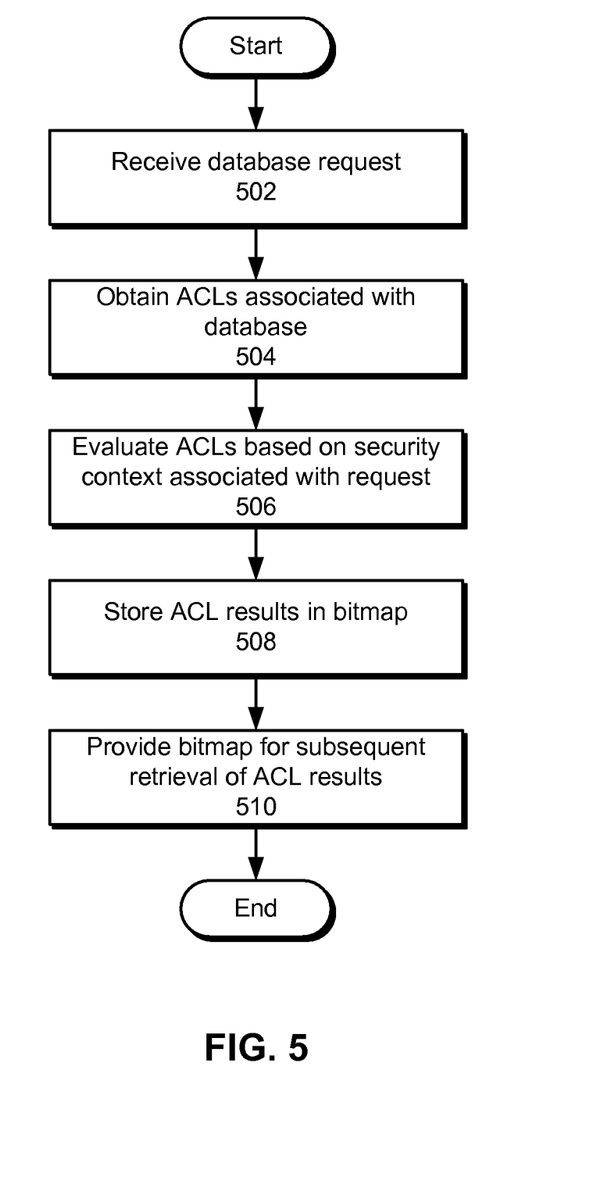
FIG. 5 shows a flowchart illustrating the process of evaluating ACLs for a database in accordance with an embodiment of the present invention.

FIG. 5 shows a flowchart illustrating the process of evaluating ACLs for a database in accordance with an embodiment of the present invention. In one or more embodiments of the invention, one or more of the steps may be omitted, repeated, and/or performed in a different order. Accordingly, the specific arrangement of steps shown in FIG. 5 should not be construed as limiting the scope of the invention.

First, a request associated with the database is received (operation 502). The request may be made by a database user for reading to, writing from, and/or executing objects in the database. Next, a set of ACLs associated with the database is obtained (operation 504). Each ACL may specify one or more access privileges associated with the request for one or more security contexts (e.g., users, roles, session information, etc.). For example, an ACL may grant access privileges for one security context and deny access privileges for another security context.

The ACLs are then evaluated based on the security context associated with the request (operation 506) to obtain a set of ACL results associated with the request. Furthermore, the ACL results are stored in a bitmap (operation 508) to enable bitwise operations to be performed on the ACL results. More specifically, ACLs that grant access privileges for the request are stored as "grant" in the corresponding ACL results, while ACLs that deny one or more access privileges for the request are stored as "deny." ACLs that do not pertain to the security context are stored as "irrelevant" ACL results, and ACLs that describe some but not all requested access privileges are stored as "unknown" ACL results in the bitmap.

Finally, the bitmap is provided for subsequent retrieval of the ACL results (operation 510). In other words, the evaluation of ACLs for the request may be performed once and the ACL results stored such that the repeated evaluation of ACLs for each object associated with the request is not necessitated. For example, the bitmap may be created upon evaluating the ACLs for the first object (e.g., database row) of the request. The bitmap may then be used in lieu of evaluating the ACLs for subsequent objects in the request, thus reducing the query time associated with the request.

Figure 6:
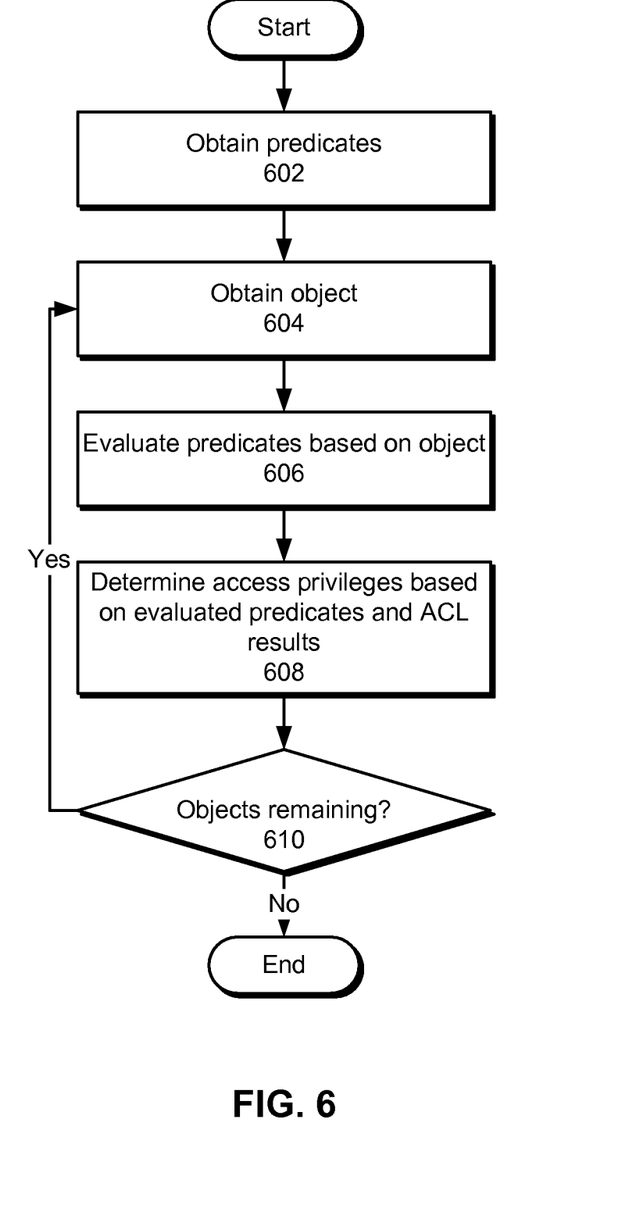
FIG. 6 shows a flowchart illustrating the process of processing a request associated with a database in accordance with an embodiment of the present invention.

FIG. 6 shows a flowchart illustrating the process of processing a request associated with a set of objects in a database in accordance with an embodiment of the present invention. In one or more embodiments of the invention, one or more of the steps may be omitted, repeated, and/or performed in a different order. Accordingly, the specific arrangement of steps shown in FIG. 6 should not be construed as limiting the scope of the invention.

First, a set of predicates associated with ACLs in the database is obtained (operation 602). As described above with respect to FIG. 5, the ACLs may be evaluated to obtain a set of ACL results that are stored in a bitmap. To process the request based on the ACLs, an object associated with the request is obtained (operation 604). The predicates are then evaluated based on the object (operation 606). In particular, the predicates may determine the relevance of the corresponding ACLs and ACL results to the objects.

Finally, access privileges to the object are determined based on the evaluated predicates and the ACL results (operation 608). For example, the access privileges may be determined by traversing the bitmap containing the ACL results, determining the applicability of each ACL result to the object based on the associated predicate, and examining applicable ACL results for grant or denial of the requested access privileges. If an ACL result specifies some but not all of the access privileges (i.e., is "unknown"), the ACL represented by the ACL result is evaluated to determine the access privileges that are specified by the ACL. Other ACLs and/or ACL results may be subsequently evaluated to determine the grant or denial of the remaining requested access privileges.

The evaluation of predicates and ACL results may be performed for remaining objects (operation 610) in the request. To do so, each object is obtained (operation 604), the predicates are evaluated based on the object (operation 606), and the access privileges to the object are determined based on the evaluated predicates and the ACL results (operation 608). The request is thus processed by reading from, writing to, and/or executing the objects based on the access privileges specified in the ACL results and predicates.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for implementing a security policy in a database, comprising:
   receiving a request associated with a first table row and a second table row in a database table;
   obtaining a set of access control lists (ACLs) associated with the database;
   evaluating the ACLs to obtain a corresponding set of ACL results associated with the database;
   storing the ACL results;
   applying a set of predicates to the stored ACL results and the first table row to obtain a first access privilege for the first table row, wherein a predicate determines the relevance of a corresponding ACL result to one or more rows of the database table;
   applying the predicates to the stored ACL results and the second table row to obtain a second access privilege for the second table row, without re-evaluating the ACLs, thereby allowing evaluation of access privileges for the first and second table rows without repeatedly evaluating the ACLs; and
   producing a result in response to the request.

2. The computer-implemented method of claim 1, wherein obtaining the ACL results involves:
   storing the ACL results in a bitmap; and
   providing the bitmap for subsequent retrieval of the ACL results.

3. The computer-implemented method of claim 2, wherein an ACL result is stored in the bitmap as a grant, a deny, an irrelevant, or an unknown.

4. The computer-implemented method of claim 1, wherein applying the set of predicates to the stored ACL results and the second table row involves:
   obtaining a predicate associated with an ACL;
   evaluating the predicate based on the second table row; and
   determining access privileges for the request based on the evaluated predicate and a stored ACL result for the ACL.

5. The computer-implemented method of claim 4, wherein the first and second access privileges are associated with at least one of a read privilege, a write privilege, and an execute privilege.

6. The computer-implemented method of claim 4, wherein the first and second access privileges are determined based on an order of the ACL results.

7. The computer-implemented method of claim 1, wherein the request corresponds to a database query.

8. The computer-implemented method of claim 1,
   wherein an ACL result is based on a security context associated with the request, and
   wherein the security context corresponds to at least one of session information associated with the request, a user associated with the request, and a role of the user.

9. A system for implementing a security policy in a database, comprising:
   a processor;
   a memory;
   a security repository comprising a set of access control lists (ACLs) associated with the database;
   a request manager configured to:
      receive a request associated with a first table row and a second table row in a database table; and
      obtain the ACLs associated with the database;
   a security manager configured to:
      evaluate the ACLs to obtain a corresponding set of ACL results associated with the database;
      store the ACL results;
      apply a set of predicates to the stored ACL results and the first table row to obtain a first access privilege for the first table row, wherein a predicate determines the relevance of a corresponding ACL result to one or more rows of the database table; and
      apply the predicates to the stored ACL results and the second table row to obtain a second access privilege for the second table row, without re-evaluating the ACLs, thereby allowing evaluation of access privileges for the first and second table rows without repeatedly evaluating the ACLs; and
   an output manager configured to produce a result in response to the request.

10. The system of claim 9, wherein the security manager is configured to obtain the ACL results by:
    storing the ACL results in a bitmap; and
    providing the bitmap for subsequent retrieval of the ACL results.

11. The system of claim 10, wherein an ACL result is stored in the bitmap as a grant, a deny, an irrelevant, or an unknown.

12. The system of claim 9, wherein the security manager is configured to apply the set of predicates to the stored ACL results and the second table row by:
    obtaining a predicate associated with an ACL;
    evaluating the predicate based on the second table row; and
    determining access privileges for the request based on the evaluated predicate and a stored ACL result for the ACL.

13. The system of claim 12, wherein the first and second access privileges are associated with at least one of a read privilege, a write privilege, and an execute privilege.

14. The system of claim 12, wherein the first and second access privileges are determined based on an order of the ACL results.

15. The system of claim 9,
    wherein the security manager corresponds to a query optimizer, and
    wherein the request corresponds to a database query.

16. The system of claim 9,
    wherein an ACL result is based on a security context associated with the request, and
    wherein the security context corresponds to at least one of session information associated with the request, a user associated with the request, and a role of the user.

17. A computer-readable storage medium storing instructions that when executed by a computer cause the computer to perform a method for implementing a security policy, the method comprising:
    receiving a request associated with a first table row and a second table row in a database table;
    obtaining a set of access control lists (ACLs) associated with the database;
    evaluating the ACL to obtain a corresponding set of ACL results associated with the database;
    storing the ACL results;
    applying a set of predicates to the stored ACL results and the first table row to obtain a first access privilege for the first table row, wherein a predicate determines the relevance of a corresponding ACL result to one or more rows of the database table;

applying the predicates to the stored ACL results and the second table row to obtain a second access privilege for the second table row, without re-evaluating the ACLs, thereby allowing evaluation of access privileges for the first and second table rows without repeatedly evaluating the ACLs; and producing a result in response to the request.

18. The computer-readable storage medium of clam 17, wherein obtaining the ACL results involves:

storing the ACL results in a bitmap; and providing the bitmap for subsequent retrieval of the ACL results.

19. The computer-readable storage medium of claim 18, wherein an ACL result is stored in the bitmap as a grant, a deny, an irrelevant, or an unknown.

20. The computer-readable storage medium of claim 17, wherein applying the set of predicates to the stored ACL results and the second table row involves:

obtaining a predicate associated with an ACL;

evaluating the predicate based on the second table row; and determining access privileges for the request based on the evaluated predicate and a stored ACL result for the ACL.

21. The computer-readable storage medium of claim 20, wherein the access privilege is associated with at least one of a read privilege, a write privilege, and an execute privilege.

22. The computer-readable storage medium of claim 20, wherein the first and second access privileges are determined based on an order of the ACL results.

23. The computer-readable storage medium of claim 17, wherein the request corresponds to a database query.

24. The computer-readable storage medium of claim 17, wherein an ACL result is based on a security context associated with the request, and wherein the security context corresponds to at least one of session information associated with the request, a user associated with the request, and a role of the user.

\* \* \* \* \*

UNITED STATES PATENT AND TRADEMARK OFFICE
CERTIFICATE OF CORRECTION

PATENT NO.       : 8,667,018 B2                                                    Page 1 of 1
APPLICATION NO.  : 12/188675
DATED            : March 4, 2014
INVENTOR(S)      : Rafiq et al.

It is certified that error appears in the above-identified patent and that said Letters Patent is hereby corrected as shown below:

In the Specification

Column 4, line 33, delete "1 .12." and insert -- 112. --, therefor.

In the Claims

Column 11, line 11, in Claim 18, delete "clam" and insert -- claim --, therefor.

Signed and Sealed this
Sixteenth Day of September, 2014

Michelle K. Lee
*Deputy Director of the United States Patent and Trademark Office*